(12) United States Patent
Bennett

(10) Patent No.: US 8,960,347 B2
(45) Date of Patent: Feb. 24, 2015

(54) MODULAR SNORKEL SYSTEM FOR OFF-ROAD VEHICLES

(75) Inventor: Patrick W. Bennett, Gainesville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 228 days.

(21) Appl. No.: 13/544,251

(22) Filed: Jul. 9, 2012

(65) Prior Publication Data

US 2014/0008136 A1  Jan. 9, 2014

(51) Int. Cl.
*B60K 13/02* (2006.01)

(52) U.S. Cl.
USPC ........................................................ 180/68.3

(58) Field of Classification Search
CPC .................. F02M 35/10013; F02M 35/10144; F02M 35/04; F02M 35/161; B60K 13/02; B60K 11/08
USPC ...................................... 180/68.1, 68.2, 68.3
See application file for complete search history.

(56) References Cited

U.S. PATENT DOCUMENTS

| | | | | |
|---|---|---|---|---|
| 5,671,802 A * | 9/1997 | Rogers | ............................ | 165/41 |
| 6,152,096 A * | 11/2000 | Setsuda | .................... | 123/184.21 |
| 6,287,354 B1 * | 9/2001 | Nozaki | ......................... | 55/385.3 |
| 6,314,931 B1 * | 11/2001 | Yasuda et al. | ............ | 123/184.53 |
| 6,530,443 B1 * | 3/2003 | Tsuruta et al. | ............... | 180/89.2 |
| 2002/0023792 A1 * | 2/2002 | Bouffard et al. | ............. | 180/68.4 |
| 2005/0217625 A1 * | 10/2005 | Niaken et al. | ............. | 123/184.21 |
| 2006/0065231 A1 * | 3/2006 | Nozaki et al. | ............. | 123/198 E |
| 2006/0219209 A1 * | 10/2006 | Tsuruta et al. | ............. | 123/198 E |
| 2006/0230728 A1 * | 10/2006 | Tsuruta et al. | ............... | 55/385.3 |
| 2007/0012274 A1 * | 1/2007 | Kawatani | ................. | 123/184.21 |
| 2009/0260906 A1 * | 10/2009 | Hartland et al. | ............. | 180/68.3 |
| 2010/0078239 A1 * | 4/2010 | Beloy | ........................... | 180/68.3 |
| 2010/0083928 A1 * | 4/2010 | Saito et al. | ............... | 123/184.56 |

* cited by examiner

*Primary Examiner* — J. Allen Shriver, II
*Assistant Examiner* — Bridget Avery
(74) *Attorney, Agent, or Firm* — Womble Carlyle Sandridge & Rice, LLP

(57) ABSTRACT

A modular snorkel system for an off-road vehicle has a hollow main body that normally is hidden from view behind a fender of the vehicle. The main body terminates at its upper end in an intake mount that projects upwardly from an end of the forward cowl of the vehicle. The other end of the main body is coupled to an end of an air tube that is configured to be routed through the engine bay of the vehicle, again normally hidden from view. The other end of the air tube is coupled through an elbow to the air filter housing of the vehicle. Various intake modules such as a low intake module, a high intake module, an in-line filter module, and others can be mounted to the intake mount of the main body to accommodate different hostile off-road conditions such as water fording and operation in deserts.

14 Claims, 5 Drawing Sheets

MODULAR SNORKEL SYSTEM FOR OFF-ROAD VEHICLES

TECHNICAL FIELD

This disclosure relates generally to accessories for off-road vehicles such as Jeep® brand vehicles and more particularly to snorkels for raising and/or moving the air intake of such vehicles to inhibit water and dust ingestion by the engine.

BACKGROUND

Off-road enthusiasts often fit their off-road vehicles with numerous accessories to enhance the vehicle's ability to traverse extreme terrain or simply to make the vehicle look more rugged. Such accessories include, for example, special tires, heavy duty bumpers, stinger bars to help prevent the vehicle from tumbling, high intensity lights, roll bars, and many others.

Stock vehicles such as Jeep® Wrangler® brand vehicles generally have air intakes that are located in the engine compartment of the vehicle and through which air is drawn into the engine to be mixed with fuel. As a consequence, dust raised during use of the stock vehicle can be ingested into the air intake, particularly when off-roading in dry sandy or dusty environments such as deserts or beaches. Perhaps more seriously, however, water can be ingested through the air intake when fording streams and rivers that are deeper than the height of the air intake or where a bow wave created by the vehicle rises above the air intake. Ingestion of water is a very serious matter as the water can make its way into the cylinders of the engine resulting in a hydrolock condition, which can ruin an engine virtually instantly.

Snorkels have long been used to raise the height at which and/or change the position where air is drawn into the engine and thereby to reduce the ingestion of dust into the air intake and to inhibit water from entering the air intake. Such snorkels are common, for example, on military and commercial vehicles and also are common accessories added to off-road vehicles by their owners. Some owners add a snorkel because they engage in extreme off-road driving while others add a snorkel because they like the rugged look it lends to a vehicle. In either case, snorkels available for off-road vehicles such as Jeep® brand vehicles have heretofore been considered unsightly by many in that much of the conduit of the snorkel leading to the air intake of the vehicle is visible on the outside of the vehicle. Furthermore, installing such snorkels has been irreparably destructive to the vehicle because most snorkel kits require that holes be drilled in a fender and/or the hood of the vehicle. Thus, if an owner wants to return the vehicle to stock condition, expensive replacement hoods and/or fenders have generally been required to replace the ones damaged when a snorkel was installed. Also, most snorkels available on the market have a fixed configuration such as, for example, a low intake configuration or a high intake configuration and once installed cannot easily be adapted from the fixed configuration to another configuration.

A need therefore exists for a snorkel system for off-road vehicles that addresses the above and other shortcomings of prior art snorkels. It is to the provision of such a snorkel system that the present invention is primarily directed.

SUMMARY

Briefly described, a modular snorkel system for an off-road vehicle such as a Jeep® Wrangler® has an air conduit assembly that, when installed, is almost completely hidden behind a fender and inside the engine compartment of the vehicle. The conduit assembly comprises a relatively flattened hollow main body having an intake mount formed at an upper end and a cylindrical outlet formed at a lower end. When installed, the intake mount of the main body replaces a metal cowl piece at the rear top of the vehicle fender and protrudes slightly upwardly from the level of the vehicle's hood. The flattened hollow main body extends downwardly from the intake mount between the inner and outer fenders of the vehicle and terminates at the back portion of the wheel well in a cylindrical outlet. Accordingly, the main body is hidden from sight behind the vehicle's fender during normal operation.

An air tube, preferably made of aluminum, is coupled at one end to the cylindrical outlet of the main body at the back portion of the wheel well with a flexible coupling and hose clamps. The air tube extends from the outlet of the main body, through the engine compartment adjacent an exhaust manifold of the engine and to an end positioned roughly beneath the air filter box of the engine. A specially designed lower air box replaces the lower air box and air inlet of the stock vehicle and is formed with a downwardly extending cylindrical inlet tube. A flexible tubular elbow is secured at one end to the end of the air tube roughly beneath the air filter box and at its other end to the downwardly extending cylindrical inlet tube of the lower air box. Thus, during operation, air is drawn by the engine into the intake mount of the main body, through the hollow interior of the main body, through the air tube within the engine compartment, into the lower air box, through an internal air filter, and into the engine.

Optional intake modules are attachable to the intake mount to form different configurations of the snorkel system. For example, a low intake module can be mounted to the intake mount and it defines an air inlet located roughly at the level of the intake mount. At this location, the air intake is moved back to the rear of the hood and raised slightly to facilitate fording of streams during off road activities. Alternatively, a high intake module can be mounted to the intake mount and it extends upwardly to an air intake located at about the level of the roof of the vehicle. At this location, dust clouds raised around the vehicle by off-road activities in dry dusty environments such as deserts are less likely to be ingested into the high air inlet of the snorkel system. Other modules such as in-line filter intakes also can be used with the system.

It will thus be seen that a modular snorkel system for off-road vehicles is now provided that is virtually hidden, that can be installed in a vehicle without forming destructive holes in fenders or hoods, that is configurable and reconfigurable with optional modules to form a variety of different snorkel configurations, and that is highly functional in extreme off-road environments. These and other features, aspects, and advantages of the snorkel system of this disclosure will become more apparent to those of skill in the art upon review of the detailed description set forth below when taken in conjunction with the accompanying drawing figures, which are briefly described as follows.

DETAILED DESCRIPTION

Figure 1:
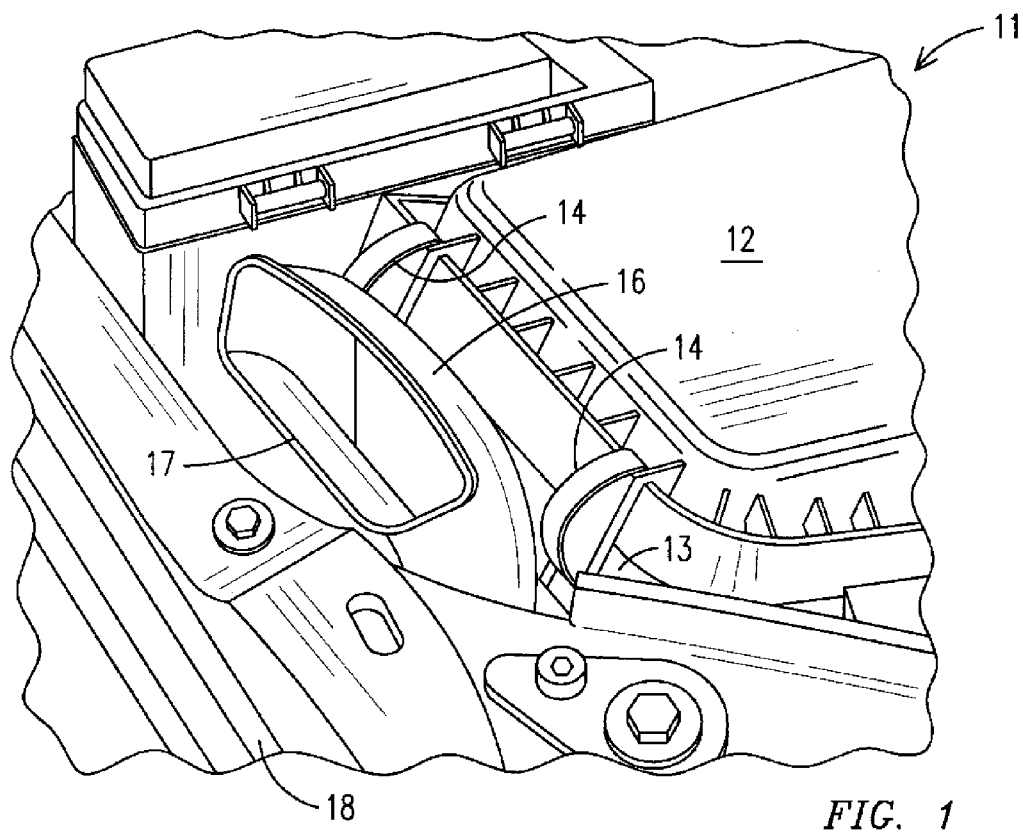
FIG. 1 is a perspective view showing a prior art stock air inlet configuration of a modern Jeep® Wrangler® brand vehicle.

Reference is now made in more detail to the above drawing figures, wherein like reference numerals indicate like parts throughout the several views. FIG. 1 shows a prior art factory air intake and air filter box of a Jeep® Wrangler® brand vehicle. A filter housing 11 comprises an upper cover 12 and a lower air box 13 that are secured together with spring clips 14 to enclose an interior portion that houses an air filter. The cover 12 communicates through an air conduit (not visible) with the throttle body of the engine. An air intake 17 has an opening between the air filter housing 11 and the fender 18 of the vehicle through which air is drawn by the engine. The air intake 17 communicates with the lower air box 13 of the filter housing 11 such that air drawn in through the air intake 17 enters the lower air box, passes through the internal filter within the housing 11 into the upper portion of the air box defined by the cover 12, and the filtered air is drawn from the upper portion into the engine through the air conduit.

The location of the factory air inlet in Jeep® Wrangler® brand and other brands of off-road vehicles is problematic for owners who engage in extreme off-road activities that may include fording streams and operating and dry dusty regions where clouds of dust are commonly kicked up around the vehicle. When fording streams, for example, the factory air inlet is located very near the front of the vehicle where water is pushed forward and aside as the vehicle moves through water. Water can thus rise or flow over the hood and become ingested through the air inlet 17, increasing the chances of a hydrolock condition. In dry dusty environments, the factory air inlet 17 is located such that it often is within the midst of dust clouds churned up by the vehicle during operation. Accordingly, much dust can easily be ingested, which can clog the air filter and threaten the engine. It will be appreciated that the factory air intake and filter box of such vehicles leaves much to be desired.

Figure 2:
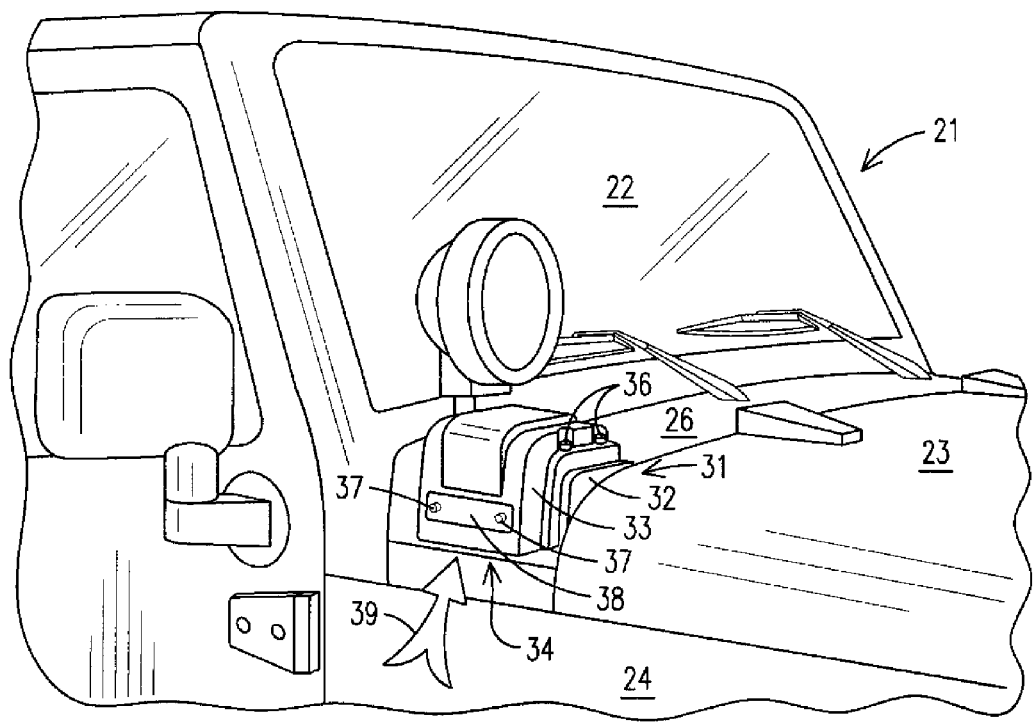
FIG. 2 is a perspective view of a portion of a Jeep® Wrangler® brand vehicle with the modular snorkel system of this invention installed and selectively configured with a low intake module according to the invention.

FIG. 2 illustrates one embodiment of a modular snorkel assembly installed on a Jeep® Wrangler® brand vehicle according to aspects of the present invention. The vehicle 21 has a windshield 22, a hood 23, a fender 24, and a forward cowl 26. From the factory, there are two curved cowl pieces at the rear top of each fender 24 of the vehicle. According to aspects of the present invention, the curved cowl piece on the right side of the vehicle, which is the same side as the air filter box is on, is removed to accommodate the slightly protruding intake assembly 31 of the snorkel system described herein. More specifically, the intake mount 32 of the system projects from below through the opening left by removal of the right side cowl piece of the vehicle. The intake mount 32 is contoured such that it complements and fits neatly within the contours of the hood in front, the windshield frame in back, and the forward cowl to the side.

The intake mount is formed with a mounting flange 35 (FIG. 5) on its top surface and the mounting flange is configured to receive a variety of optional modules for configuring the snorkel system according to need and taste. In FIG. 2, the snorkel system is configured as a low intake system. More specifically, a low air intake module 33 is mounted to the intake mount 32 covering the mounting flange 35 and is secured to the intake mount 32 with bolts 36 and 37. Bolts 36 are threaded downwardly into recessed nuts molded into the intake mount 32 to tighten the low intake module sealingly against the mounting flange 35. Similarly, bolts 37 also are threaded into recessed nuts in the intake mount 32 to secure the low intake module against the side of the intake mount and form a rugged rigid structure. A metal base plate 38 may be used to stabilize the bolts 37 and may double as a logo plate bearing the logo or trademark of a manufacturer or seller.

When secured to the intake mount 32, the lower intake module 33, in conjunction with the surfaces of the intake mount itself, define an air inlet 34. The air inlet 34 faces downwardly and forces air 39 drawn through the inlet to travel a circuitous path first up through the air inlet, then around toward the mounting flange 35 in the top of the intake mount, then downwardly into the main body of the snorkel behind the finder 24, as described in more detail below. The inventors have found through testing that such a configuration substantially eliminates water leakage through the air inlet 34 and into the main body of the snorkel system in prolonged and driving rains. Furthermore, the air inlet 34 is now located above the engine 3 feet behind and 7 inches above the location of the factory air inlet 17 (FIG. 1). This location places the air inlet not at the front of the vehicle where water is being pushed up to form a bow wave, but further back and well inside the already formed bow wave moving away from the vehicle while fording a stream. Thus, the likelihood that water will be ingested through the air inlet 34 is greatly reduced when fording streams, especially where good fording technique is applied.

Figure 3:
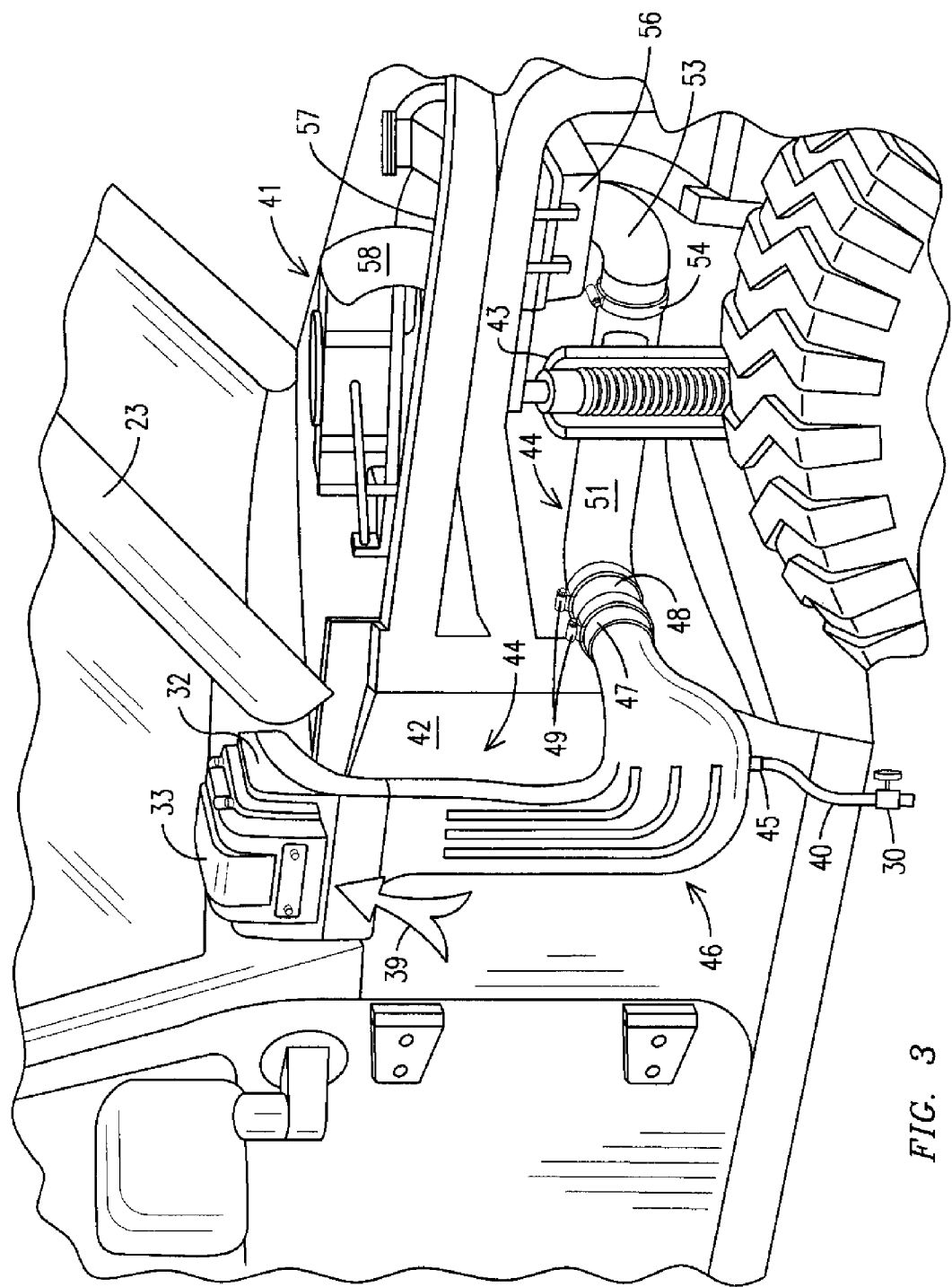
FIG. 3 is a perspective view of the Jeep® Wrangler® brand vehicle of FIG. 1 with its right fender removed to reveal hidden components of the modular snorkel system normally hidden from view behind the fender.

FIG. 3 shows the snorkel system of this invention installed on a Jeep® Wrangler® brand vehicle with the right fender of the vehicle removed to reveal the normally hidden remaining components of the snorkel system. The vehicle has a hood 23, which is open in this figure to reveal the vehicle's engine 41. With the outer fender removed, the inner fender 42 is visible as is the shock tower 43 and other frame components of the vehicle. The snorkel system 44 comprises a main body 46 having an intake mount formed at its upper end and terminating in a cylindrical outlet 47. The outlet 47 is connected through a flexible coupling 48 and pipe clamps 49 to an end of a metal air tube 51 at the rear of the wheel well. The air tube 51, in turn, extends through the engine compartment between the exhaust manifold of the engine and the shock tower 43 to a forward end. A flexible elbow 53 attaches to the forward end of the air tube 51 and turns upwardly to connect to the lower air box 56. Thus, the engine draws air through the low intake module as indicated at 39, down through the main body 46, through the air tube 51 and flexible elbow 53 and into the air box, where it passes through an air filter before moving to the throttle body of the engine.

The main body 46 of the snorkel system extends first downwardly from its exposed intake mount 32 to a lower section 28 and thus defines a generally hollow downwardly extending air passageway that is relatively thin and wide. The thickness of the main body is selected so that the main body fits between the inner fender 42 and the outer fender 24 (FIG. 2) and thus normally is hidden from view behind the outer fender. The width of this portion is selected such that the cross-sectional area throughout the passageway is at least the minimum cross-sectional air intake area required by the engine. In the case of the Jeep® Wrangler® brand vehicle shown, this minimum cross sectional area is about 6 square inches; however, other vehicles may have other requirements. The main body may be formed from any appropriate material through any appropriate fabrication technique, but in the illustrated embodiment is formed of a plastic material through a traditional blow molding process.

The lower portion 28 of the main body 46 extends to a position that is significantly below the level of the cylindrical outlet 47 of the main body. In this way, the lower section 28 forms a sump within which any water splashed into or otherwise entering the intake of the snorkel assembly 44 is trapped and prevented from being drawn further through the snorkel and possibly into the engine of the vehicle. A nipple 45 is formed at the bottom of the main body for draining collected water from the sump and, in this embodiment; a drain tube 40 is coupled to the nipple 45 and terminates in a manual drain valve 30. Periodically, a user of the vehicle may open the drain valve 30 to allow any water collected in the sump to drain away. When not being used, the drain tube 40 may simply be tucked behind the outside fender and out of sight.

The cylindrical outlet 47 of the main body, which also has an internal cross sectional area of at least the minimum required by the engine, communicates with the rear end of the air tube 51 through a flexible connection 48, which may, for example, comprise a rubber sleeve. The flexible connection 48 is fixed onto the cylindrical outlet 47 and onto the rear end of the air tube 51 by means of hose clamps 49, which have been tightened around the flexible connection. The flexible connection 48 functions to, among other things, help absorb relative vibrations and other movements between the main body 46 and the air tube 51 of the snorkel system. This is important since the air tube is connected to the frame of the vehicle whereas the main body is connected to the body of the vehicle.

The air tube 51 is made of an appropriate heat resistant material since it passes close to the normally hot exhaust manifold of the engine 41. In the preferred embodiment, the air tube 51 is formed of metal, and more specifically of aluminum. A heat shield 55 (FIG. 5) is welded or otherwise attached to the air tube 51 on the side of the tube that passes closest to the exhaust manifold and preferably defines an air space between the heat shield and the surface of the air tube 51. This has been found to maintain the air tube 51 at a cool running temperature even though it passes within an inch or so of the exhaust manifold, which can reach temperatures of 600-700 degrees Fahrenheit. Tests by the applicant have shown, for instance, that under such conditions, the temperature of the air tube 51 during operation of the vehicle remains around 110 degrees Fahrenheit despite the high temperature of the adjacent exhaust manifold. This eliminates overheating of the air tube and maintains the air temperature at a desirably cool running temperature, which contributes to efficient operation of the engine.

The forward end of the air tube 51 is coupled to a flexible elbow 53 and fastened thereto with a tightened hose clamp 54. The elbow 53 extends forwardly from the forward end of the air tube 51 and thence turns upwardly beneath the air box of the vehicle. As described in more detail below, the snorkel system of the invention includes a modified lower air box wherein a cylindrical inlet projects downwardly from the bottom of the lower air box to be received into the upper end of the flexible elbow 53. Thus, air can be drawn through the conduit formed by the snorkel system, into the lower air box, through the internal filter of the air box, and into the throttle body of the engine to be mixed with fuel. Again, the flexible elbow helps to absorb any relative vibrations or motion between the air tube 51 and the air box, which are attached to different parts of the vehicle.

Figure 4:
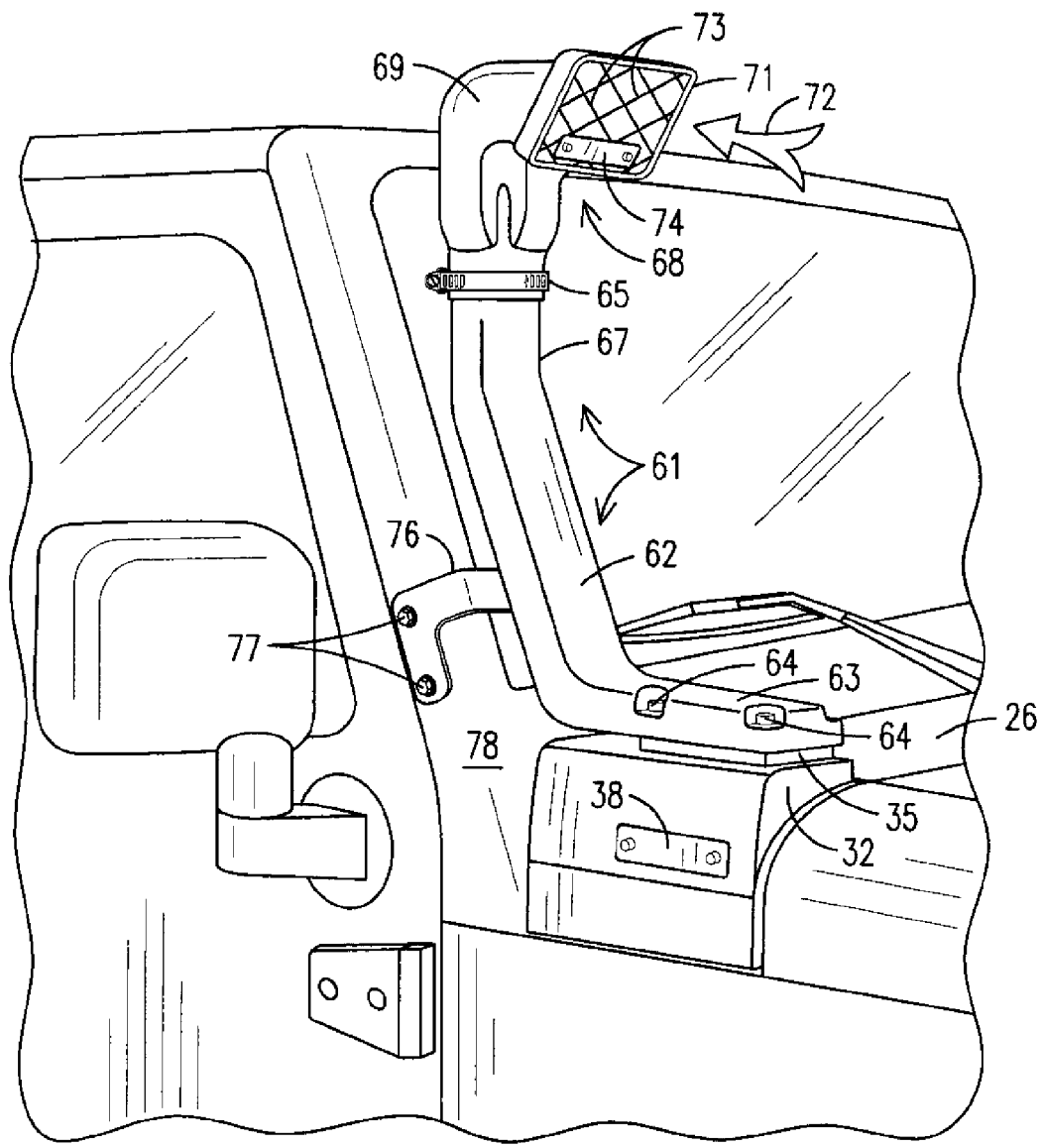
FIG. 4 is a perspective view of a portion of a Jeep® Wrangler® brand vehicle with the modular snorkel system of this invention installed and selectively configured with a high intake module according to the invention.

FIG. 4 illustrates the modular snorkel system of this invention with a high intake module attached to the intake mount 32 of the main body. The intake mount 32 is formed with a rectangular coupling flange 35 that opens into the interior of the intake mount 32. In the previously described embodiment, a low intake module 33 was described as being mounted to the intake mount covering the rectangular coupling flange 35. In the embodiment of FIG. 4, the low intake module is removed and replaced by high intake module 61 that is secured to the intake mount 32 covering the coupling flange by bolts 64. The high intake module 61 comprises a hollow mounting cowl 63 configured to fit sealingly over the coupling flange 35 so that the interior of the mounting cowl is in fluid communication with the main body of the system described above. A tubular extension 62 extends upwardly and slightly rearwardly from the rear end of the mounting cowl 63 and is configured to extend along a side of the windshield of the vehicle as shown. A bracket 76 secures the tubular extension 62 by being fastened to the vehicle body with bolts 77, which may already be present on the vehicle.

The tubular extension 62 terminates in a generally cylindrical open end 67 that preferably has a diameter that is standard in the industry for receiving various accessories such as in-line filters, ram intakes, and the like. In the illustrated embodiment, a ram intake 68 is mounted on the cylindrical open end 67 and is removably secured with a hose clamp 65. The ram intake 68 terminates in a generally forwardly facing inlet 71 through which air is drawn into the snorkel system and ultimately into the engine, as indicated by numeral 72. The inlet 71 in this embodiment is spanned by a grille 63, which prevents large insects and other debris from being ingested into the snorkel system. A logo plate 74 may be applied if desired for decorative effect and/or to display the logo of a company. A second logo plate 38, which is used as a support plate when the low intake module 33 is mounted as described above, is merely bolted to the side of the intake mount 32 to cover the mounting holes formed therethrough.

With the high intake module 61 mounted as described, air is drawn into the engine through inlet 71, which is located much higher that the inlet of a low intake module. Such a configuration is particularly useful when off-roading in dusty dry environments such as deserts where the vehicle raises dust clouds. The dust clouds tend to accumulate around the body of the vehicle and gradually thin toward the roof of the vehicle. Since the inlet 71 is located generally at the roof line of the vehicle, air drawn into the inlet tends to be significantly lest dusty than air drawn in at a lower position. Some owners also believe that the high intake 61 lends the vehicle a more rugged look, which they like.

Figure 5:
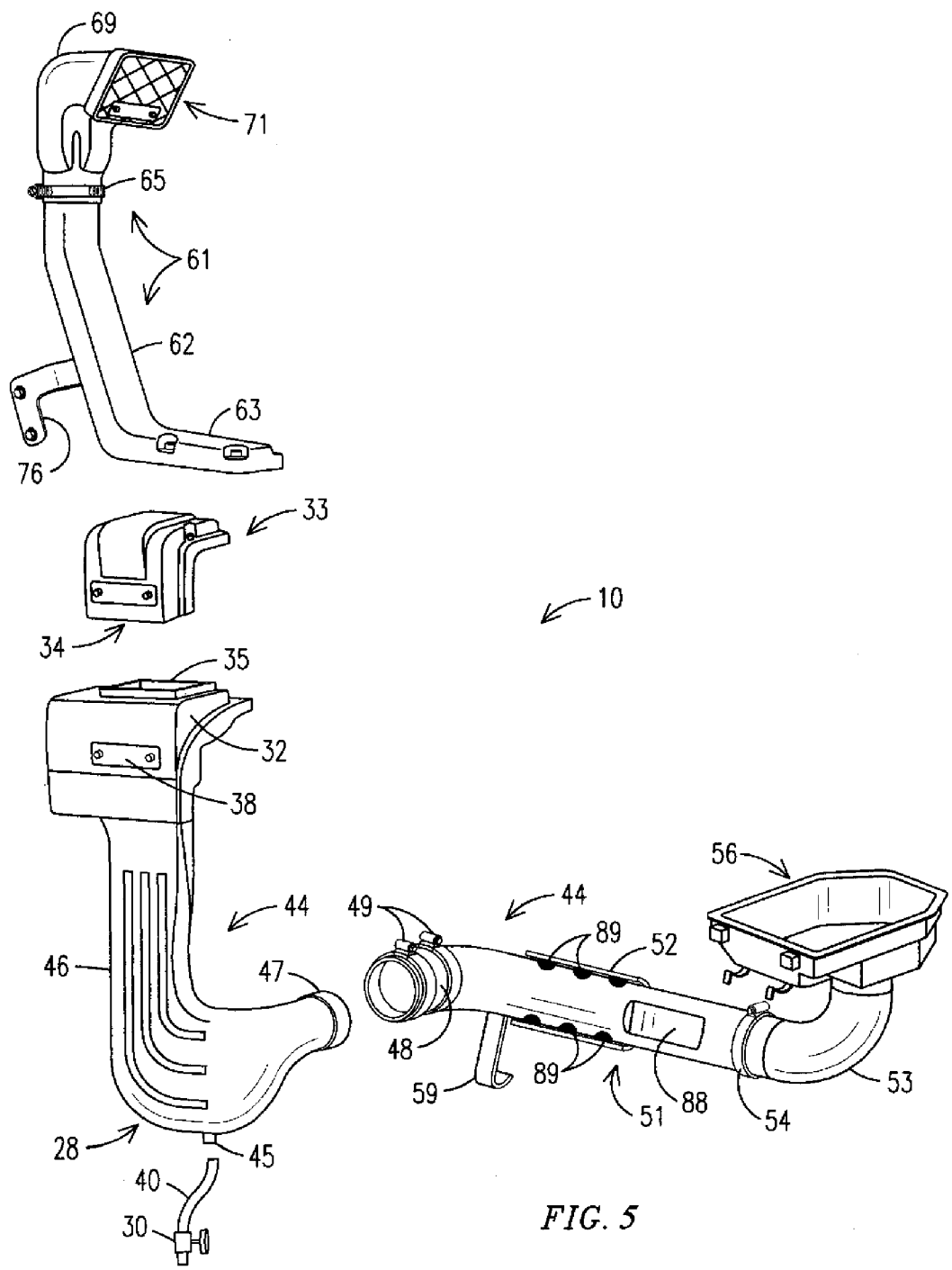
FIG. 5 is a partially exploded perspective view showing various components of the modular snorkel system in perhaps a clearer fashion.

FIG. 5 illustrates the modular snorkel system of this invention in exploded perspective and shows, perhaps better, many of the features of the various components of the system. Since the components have been described in detail above, they only need be described generally with respect to FIG. 5. The system 10 comprises the main body 46 sized and configured to be hidden within the outer fender of a vehicle. It terminates at its upper end in intake mount 32, which is formed with a rectangular mounting flange 35. The main body 46 terminates at its other end in cylindrical outlet 47 and the lowermost portion of the main body defines a sump 28 below the level of the cylindrical outlet for trapping moisture. A nipple 45 communicates with the sump and is sized to receive a drain hose 40 having a drain valve 30 for draining water from the sump when necessary.

The air tube 51 has a curved upstream end that is adapted to be coupled to the cylindrical end 47 of the main body with a flexible connector 48 and hose clamps 49. A mounting stanchion 59 is welded or otherwise secured to the air tube 51 and extends downwardly therefrom in this embodiment for being secured with a bolt to the frame of the vehicle. A metal heat shield 52 is welded to the air tube at welds 89 and extends around the air tube on the hidden side in FIG. 5 at the location wherein the air tube is closest to the engines exhaust manifold. The heat shield 52 preferably is spaced from the surface of the air tube to define an air gap between the heat shield and the air tube. An indentation 88 may be formed in the air tube at the location where the air tube extends past the shock tower of the vehicle to avoid interference between the shock tower and the air tube 51. A flexible elbow 53 is coupled to the forward end of the air tube 51 and curves upwardly where it is coupled at its other end to the cylindrical mounting flange 83 (FIG. 6) of the lower air box 56.

The intake mount 32 is configured to accept one of a variety of intake modules as described. In FIG. 5, the low intake module 33 and the high intake module 61 are shown as options. The invention is not limited to these two modules, however, and a large number of other modules might well be incorporated such as pre-filters, domed intakes, and the like, all within the scope of the invention.

Figure 6:
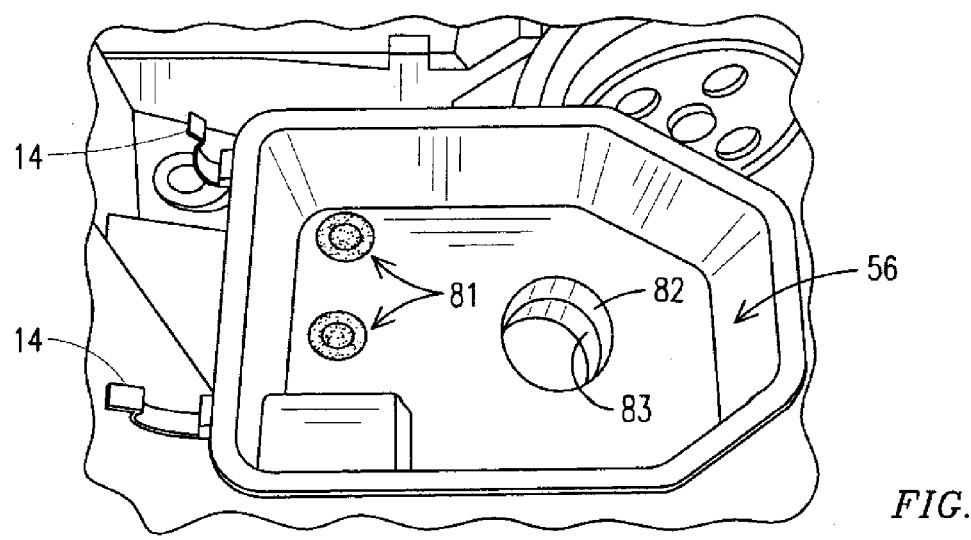
FIG. 6 is a top perspective view showing a preferred configuration of the specially designed lower air box that replaces the stock lower air box and air inlet of a Jeep® Wrangler® brand vehicle.

FIG. 6 is a view from above of the lower air box of the snorkel system that replaces the factory lower air box of the air filter enclosure. More specifically, the lower air box 56, which may be molded of plastic, includes an open top body having a floor with a circular opening 82 formed therethrough. A cylindrical mounting flange 83 extends downwardly from the opening 82 and is sized to receive the upper end of the flexible elbow 53 (FIG. 5), which may be secured with a hose clamp or other fastener. The lower air box 56 is secured with bolts 81, which preferable are sealed with sealant as shown. Clips 14, preferably removed from the factory lower air box, are applied to the modified lower air box of this system for locking the factory upper air box to the lower air box 56 with a filter element between them. Thus, air drawn through the snorkel system enters through the opening 82 in the lower air box, passes through the air filter into the upper air box, and moves into the engine through the throttle body. Other types of filter systems such as, for instance, in-line sealed filtration systems may be incorporated in place of the air filter arrangement shown in the preferred embodiments described herein, in which case the factory air box may be eliminated altogether.

The invention has been described herein within the context of preferred embodiments and methodologies considered by the inventor to represent the best mode of carrying out the invention. It will be apparent to those of skill in the art, however, that numerous additions, deletions, and modifications, both subtle and gross, may well be made to the illustrated embodiments without departing from the spirit and scope of the invention. For example, the air tube is illustrated as being made of aluminum in the preferred embodiments. It may, however, be made of another material such as molded plastic that is shaped and contoured to provide a sufficient clearance between the air tube and the hot engine. The particular route of the preferred embodiment through the engine bay and then behind the fender is not a limitation of the invention and other routs may be selected. Even more broadly, the invention is directed to a snorkel system for off-road vehicles wherein the snorkel conduits are hidden from view except for the intake and wherein no irreversible modifications to the body of the vehicle are required for installation. These and other revisions, additions, and modifications are possible within the scope of the invention, which is delineated only by the claims.

What is claimed is:

1. A snorkel for a vehicle having a front outer fender, a front inner fender, an engine compartment, and an air box within the engine compartment through which intake air is drawn, the snorkel comprising:
    an air tube defining an internal passageway and being in fluid communication at one end with the air box with the air tube extending rearwardly within the engine compartment to an opposite end;
    a main body defining an internal passageway and being in fluid communication at an outlet end with the opposite end of the air tube, the main body being configured to extend upwardly between the outer front fender and the inner front fender of the vehicle to an upper end so that a major portion of the main body is substantially hidden from view; and
    an intake mount coupled to the upper end of the main body to which intake modules can be selectively attached, the intake mount being exposed above the front outer fender of the vehicle.

2. A snorkel as claimed in claim 1 further comprising an intake module attached to the intake mount.

3. A snorkel as claimed in claim 1 wherein the air tube is made of metal.

4. A snorkel as claimed in claim 1 wherein the main body is configured to form a sump at a lower extent, the sump being located below the inlet end of the main body for collecting water that may be injected into the main body and preventing the water from entering the air tube.

5. A snorkel as claimed in claim 1 further comprising a mounting flange on the intake mount for receiving intake modules.

6. A snorkel as claimed in claim 2 wherein the intake module comprises a low intake module.

7. A snorkel as claimed in claim 2 wherein the intake module comprises a high intake module.

8. A snorkel as claimed in claim 2 further comprising a valve coupled to the sump to allow water to be drained from the sump selectively by a user.

9. A snorkel as claimed in claim 6 wherein the low intake module is configured to direct air first upwardly and then downwardly into the intake mount.

10. A snorkel as claimed in claim 7 wherein the high intake module terminates in an inlet substantially at the level of the top of the vehicle.

11. A snorkel as claimed in claim 10 wherein the inlet is a ram scoop.

12. A snorkel as claimed in claim 3 further comprising a heat shield attached to the air tube and being located to shield the air tube from heat of an adjacent engine.

13. A snorkel as claimed in claim 12 wherein the heat shield is located adjacent an exhaust manifold of the engine.

14. A snorkel as claimed in claim 4 further comprising a drain tube coupled to the sump of the main body for draining water collected in the sump.

* * * * *